Oct. 9, 1951 A. HAZELTINE 2,570,805

SIGNAL TRANSLATING SYSTEM

Filed July 20, 1946 2 Sheets-Sheet 1

INVENTOR.
ALAN HAZELTINE
BY Harry C. Page
ATTORNEY

Oct. 9, 1951 A. HAZELTINE 2,570,805

SIGNAL TRANSLATING SYSTEM

Filed July 20, 1946 2 Sheets-Sheet 2

INVENTOR.
ALAN HAZELTINE
BY Harry C. Page
ATTORNEY

Patented Oct. 9, 1951

2,570,805

UNITED STATES PATENT OFFICE 2,570,805

SIGNAL-TRANSLATING SYSTEM

Alan Hazeltine, Maplewood, N. J., assignor to Hazeltine Research, Inc., Chicago, Ill., a corporation of Illinois Application July 20, 1946, Serial No. 685,110

12 Claims. (Cl. 250—27)

Figure 1:
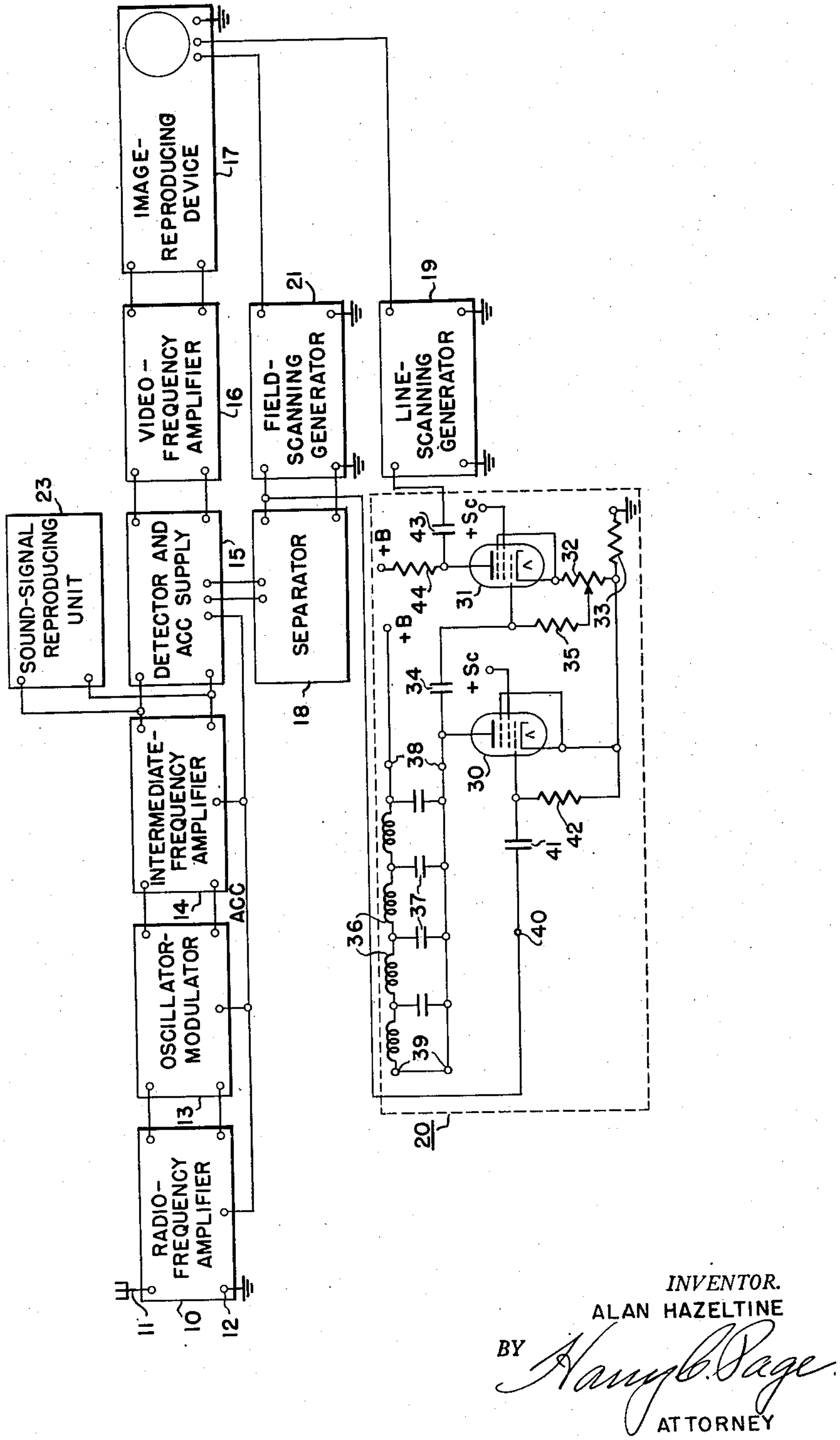

This invention relates, in general, to systems for translating recurring signal pulses of a fixed period and for distinguishing such pulses from undesired periodic signals having the same frequency as said desired signals but occurring approximately halfway between said desired signals. It is similar to the signal-translating system disclosed in a copending application, Serial No. 692,533 filed August 23, 1946, now Patent No. 2,522,706, issued September 19, 1950, in the name of Michael J. Di Toro and assigned to the same assignee as the present invention. Although the invention is subject to a wide variety of applications, it is especially suited for inclusion in the synchronizing signal separating apparatus conventionally incorporated into present-day television receiving systems. In the material to follow, this particular use is considered in detail.

The separating apparatus of such a receiver is intended to delete all undesired or spurious pulses, noise and static from an applied composite television signal and to deliver only its desired synchronizing pulses to the scanning system. Many arrangements, featuring the use of time-delay networks, for accomplishing this result have been introduced into the art. For example, it has been proposed to provide a periodic wave repeater comprising a vacuum tube normally biased substantially to cutoff and having input and output circuits, one of which serves as a sensitivity control for the tube. A time-delay network is coupled to the sensitivity control so that when a desired output pulse is obtained from the repeater an input pulse is applied to the delay network. This latter pulse is delayed and subsequently applied to the sensitivity control with such polarity as to sensitize the tube for operation at the time a succeeding ouput pulse is due. Repeaters of this type may not be entirely effective in clearing all unwanted frequency components from an applied television signal especially where spurious pulses of an unusually high amplitude are present.

A different type of prior separator comprises a degenerative amplifier having a reflecting delay line in its cathode circuit to control degeneration. When employed to discriminate in favor of the line-frequency pulses of an applied composite television synchronizing signal, the line is short-circuited at its far end and has a round-trip delay equal to the line period. As a consequence, the amplifier has little degeneration for the line pulses but is highly degenerative for all signals of different periods. The arrangement here proposed utilizes a regenerative time-delay network further to improve the discrimination and make the signal separation more complete.

It is an object of the present invention, therefore, to provide a system for translating and discriminating in favor of recurring signal pulses of a fixed period which avoids one or more of the above-mentioned limitations of prior arrangements.

It is another object of the invention to provide a new and improved signal-translating system featuring the use of a time-delay network for translating recurring signal pulses of a given period and for distinguishing such pulses from undesired periodic signals having the same frequency as said desired signals but occurring approximately halfway between said desired signals.

It is a specific object of the invention to provide a new and improved system having a relatively small physical size for translating a television signal and for separating synchronizing pulses thereof which have a fixed period.

In accordance with the invention, a system for translating desired recurring signal pulses having a given period and for distinguishing such pulses from undesired periodic signals having the same frequency as said desired signals but occurring approximately halfway between said desired signals comprises a signal-translating stage. This stage includes a pair of vacuum tubes cross coupled so that a pulse of a given polarity applied thereto effects a complete cycle of conductance variations in opposite senses in the tubes to translate the applied pulse therethrough. A multiple-reflecting time-delay network is included in the stage and is so proportioned as to have a round-trip time-delay period corresponding substantially to one-half of the given period so that an applied pulse translated along the network produces a delayed image thereof. The network is coupled to the tubes to apply the image thereto to initiate other cycles of conductance variations in the tubes for regenerating image pulses obtained from the network and pulses of the aforesaid period applied to the system with the above-mentioned given polarity. The system also has an input circuit, means for applying the recurring pulses to the input circuit with the given polarity referred to, and an output circuit for supplying pulses translated through the system to a utilizing device. "Image" is used in this description and in the appended claims to denote an output signal obtained from a time-delay network in response to an applied pulse, the image having the same wave form as the original pulse except for the distortion which may be inherent in the network. Also, the term "original pulse" is intended to mean the signal or disturbance applied to the network which gives rise to the image.

For a better understanding of the present invention, together with other and further objects thereof, reference is had to the following description taken in connection with the accompanying drawings, and its scope will be pointed out in the appended claims.

Figure 2:
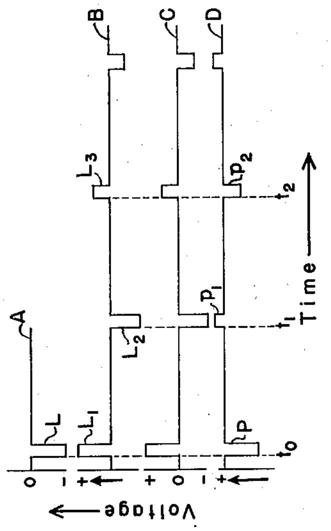
Figure 3:
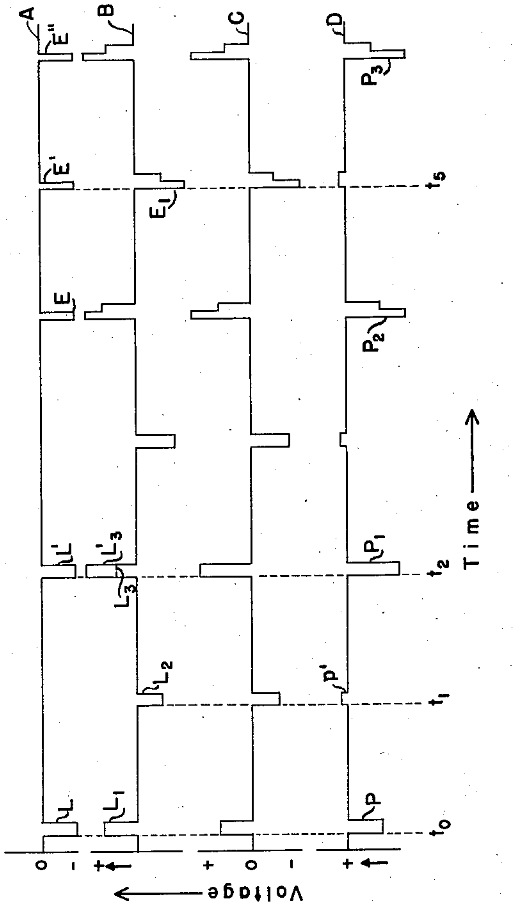

In the drawings, Fig. 1 is a schematic representation of a composite television wave-signal embodying the invention, and Figs. 2 and 3 include graphs utilized in explaining the operation of the Fig. 1 arrangement.

Referring now more particularly to Fig. 1, the television carrier-wave-signal receiver there represented is of the superheterodyne type and includes a radio-frequency amplifier 10 of any desired number of stages having its input circuit connected to an antenna-ground system 11, 12. Coupled in cascade with the output circuit of radio-frequency amplifier 10, in the order named, are an oscillator-modulator 13, an intermediate-frequency amplier 14 of one or more stages, a wave-signal detector and automatic-contrast-control (ACC) supply 15, a video-frequency amplifier 16 of any desired number of stages, and an image-reproducing device 17 which may be of the cathode-ray tube type. A synchronizing signal separator 18 is also coupled to an output circuit of detector 15. It has an output circuit directly connected to a field-scanning generator 21 and coupled by way of an intersynchronizing signal separator 20, to be described more particularly hereinafter, to a line-scanning generator 19. The output circuits of scanning generators 19 and 21 are connected to scanning elements of the reproducing device 17 in conventional manner. A contrast-control potential derived from the ACC supply of unit 15 is applied to the input circuits of one or more of the tubes of radio-frequency amplifier 10, oscillator-modulator 13 and intermediate-frequency amplifier 14 in well-known manner.

A sound-signal reproducing unit 23 is also coupled to an output circuit of intermediate-frequency amplifier 14. It may have stages of intermediate-frequency amplification, a sound-signal detector, stages of audio-frequency amplification and a sound-reproducing device.

It will be understood that the various units thus far described, with the exception of inter-synchronizing signal separator 20, may be of any conventional design and construction. The details of such components are well known in the art, rendering a further detailed description thereof unnecessary.

Considering briefly the operation of the receiver as a whole and assuming for the moment that unit 20 is a conventional intersynchronizing signal separator, a desired modulated carrier-wave-television signal is intercepted by antenna system 11, 12. This signal is selected and amplified in radio-frequency amplifier 10 and applied to oscillator-modulator 13, wherein it is converted into an intermediate-frequency signal. The intermediate-frequency signal is selectively amplified in amplifier 14 and supplied to detector 15 where its modulation components are derived. These components, which comprise video-frequency as well as synchronizing signal components, are amplified in video-frequency amplifier 16 and thereafter applied to the brilliancy-control electrode of the cathode-ray tube included in reproducing device 17 to modulate the intensity of the beam thereof in accordance with the video-frequency modulation. The synchronizing signal components or pulses of the received signal are separated from the video-frequency content in separator 18 and are used to synchronize the operation of line-scanning and field-scanning generators 19 and 21, respectively. These generators supply scanning signals of saw-tooth wave form which are properly synchronized with reference to the received television signal and applied to the deflecting elements of image-reproducing device 17, thereby to deflect the cathode-ray beam thereof in two directions normal to each other to reproduce the received television image. The automatic-contrast-control or ACC bias derived in unit 15 is effective to control the amplification of one or more of units 10, 13 and 14 to maintain the signal input to detector 15 and to the sound-signal reproducing unit 23 within a relatively narrow range for a wide range of received signal intensities.

The sound-signal modulated-carrier wave accompanying the desired television modulated-carrier wave is concurrently intercepted by antenna system 11, 12. After selective amplification in radio-frequency amplifier 10, it is applied to oscillator-modulator 13 and converted into a sound-modulated intermediate-frequency signal. The sound-modulated intermediate-frequency signal is delivered to unit 23 wherein it is amplified and detected to derive the sound-modulation components, which are further amplified and reproduced by the sound-reproducing device.

Referring now more particularly to the inter-synchronizing signal separator 20, this unit may be thought of as a system for translating recurring signal pulses having a given period and for distinguishing such pulses from undesired periodic signals having the same frequency as said desired signals but occurring approximately half-way between said desired signals. As utilized in the embodiment under consideration, the system is to translate and discriminate in favor of the line-synchronizing pulses which recur with a fixed periodicity in a composite television signal conforming to the RMA (Radio Manufacturers Association) standards accepted and followed in commercial television broadcasting. The system comprises a signal-translating stage which, preferably, is of the regenerative type. As illustrated, this stage includes a pair of pentode vacuum tubes 30 and 31, having input and output electrodes and cross coupled so that an applied pulse of particular polarity effects conductance variations therein to translate the pulse through the stage, in a manner to be described more particularly hereinafter. The anode of tube 30 is connected through a delay network presently to be described to a space-current source +B, while the corresponding electrode of tube 31 connects to a source +B through an anode impedance 44. The screen electrodes of both tubes receive operating potentials from suitable sources +Sc. A cathode impedance 32 associated with tube 31 comprises means for stabilizing the operation of the stage and for permitting the operation to be substantially independent of variations in tube characteristics. The cathode elements of both tubes are grounded through a second but common cathode impedance 33. The operating potentials and biasing arrangements of the tubes are selected so that tube 30 is normally maintained in a highly conductive condition while the other tube 31 is normally close to anode-current cutoff. The forward coupling between the tubes is provided by a condenser 34 and grid resistor 35, the latter being associated with an adjustable tap on cathode impedance 32 for the purposes of self-bias. The reverse coupling is provided by the cathod resistor 33.

The separator system also has time-delay means included in the signal-translating stage just referred to and responsive to an applied pulse for producing at least two delayed images thereof. This means is shown as a multiple-reflecting time-delay network comprising a plurality of serially-connected inductors 36, 36 and intermediate shunt-connected condensers 37, 37 arranged in the manner of a ladder-type delay network. The total time delay of such a network is determined by its total series inductance and total shunt capacitance. In the instant embodiment of the invention, these parameters are chosen to introduce a one-way delay in the network, that is, a delay in signal translation from one end to the other, which is equal to one-quarter of the time separation of succeeding line-synchronizing pulses of the received television signal to be translated. With this selection the round-trip delay, corresponding to the time required for a signal applied to the near end to traverse the network to the far end and be returned again to the near end, is equal to one-half of the line period. The network has terminals 38, 38 at its near or input end and terminals 39, 39 at its opposite or far end. The far end is short-circuited, providing a polarity-reversing reflecting termination. The delay network is connected at its near end to the output electrodes of tube 30, as indicated by the series relationship of the anode of this tube, input terminals 38, 38 and the source +B. This circuit arrangement causes the input end to be effectively on open circuit in view of the high impedance exhibited by the output electrodes of a tube of the pentode type. The coupling condenser 34 also serves to connect the input end of the network to the input electrodes of the alternate tube 31, completing a circuit arrangement through which regeneration of certain image pulses obtained from the network may be had in a manner to be pointed out subsequently.

An input circuit for the system is connected with the input electrodes of tube 30 and includes an input terminal 40, a coupling condenser 41 and grid resistor 42. Terminal 40 is connected with the output circuit of separator 18, thereby to constitute means for applying recurring line-synchronizing pulses to the input circuit of the system with a given polarity, specifically with negative polarity. The system also has an output circuit for supplying pulses translated therethrough to a utilizing device. For the application under consideration, this output circuit comprises a condenser 43 connecting the output electrodes of tube 31 with a synchronizing-control circuit of line-scanning generator 19.

In considering the operation of intersynchronizing signal separator 20, the response to a single applied pulse of negative polarity will be described initially with reference to the graphs of Fig. 2. Curve A represents a single line-synchronizing pulse L of negative polarity applied at the time $t_0$ to input terminal 40. The leading portion of the applied pulse drives tube 30 in the direction of anode-current cutoff and supplies, by way of condenser 34, a potential variation of positive polarity to the input electrodes of tube 31, causing the latter to be rendered more conductive. The resulting increase in anode current of tube 31 applies a positive potential to the cathode of tube 30, tending further to drive this tube in the direction of anode-current cutoff. In this manner, the normal conductive conditions of the tubes are rapidly reversed so that, throughout the duration of the applied pulse L, tube 30 is less conductive than normally, while tube 31 is more conductive. The potential variations established at the anode of tube 30, at the control electrode of tube 31, and at the anode of tube 31 are represented by curves B, C, and D, respectively. At the end of the pulse period, the potentials present in the electrode systems of tubes 30 and 31 are returned to their initial values, restoring the conductivity of each tube to its normal condition. In other words, the applied pulse L of negative polarity effects a complete cycle of conductance variations but in opposite senses in the cross coupled tubes and translates the applied pulse through the system to the output circuit, as shown by pulse component P of curve D. The regeneration introduced by the cross coupling causes the output pulse P to appear with an amplitude gain.

The pulse translation which manifests itself as a pulse $L_1$ of positive polarity in the output circuit of tube 30 applies a positive pulse to the input end of time-delay network 36, 37. This pulse is translated along the network to its remote end where it undergoes a reflection and polarity reversal. The reflected reversed-polarity pulse $L_2$ reappears at the input end of the network at the time $t_1$, representing a delay with respect to the original or incident pulse $L_1$ that is equal to one-half of the line period. The reflected and reversed-polarity pulse $L_2$ may be thought of as an image of the original pulse, having the same wave form but a smaller amplitude due to signal attenuation in the network. This image, which is of negative polarity, is applied through condenser 34 to the input circuit of tube 31. It biases that tube to cutoff for the duration of the image but produces only a small pulse variation $p_1$ in its output circuit, since tube 31 is normally close to anode-current cutoff.

The near end of the time-delay network which is effectively on open circuit reflects the first image pulse $L_2$ without a polarity reversal and sends it back down the network. At the time $t_2$ a second image pulse $L_3$ appears at the input terminals of the network. It is of positive polarity because the far end of the network is short-circuited. It has a delay relative to the first image $L_2$ of one-half the line period and a full line-period delay with respect to the initial synchronizing pulse L. The image $L_3$, as applied to the input circuit of tube 31, has the same effect as the first applied line-synchronizing signal L. It initiates another complete cycle of conductance variations in which this image is regenerated by the cross coupled tubes. This gives rise to a further output pulse $p_2$ in the output circuit of tube 31 and also applies a positive pulse to the time-delay network for translation therethrough. The regeneration is chosen to cause the system to be slightly dissipative. That is to say, the over-all gain of the system, so far as the application of regenerated pulses to delay network 36, 37 is concerned, is less than unity. This is apparent in curve D wherein the translated line-synchronizing pulse P has a greater amplitude than the regenerated image pulse $p_2$. The regeneration partially overcomes the attenuation of the delay network and causes it to exhibit a low decrement. Therefore, the described operation is repeated, producing at the near end of the network a series of images which alternate in polarity and have a separation of one-half the line period. Ultimately, the dissipation in the system damps out the images and restores the initial conditions.

The response of the separator to recurring line-synchronizing pulses is represented by the curves of Fig. 3. They represent the same potential variations as the curves of Fig. 2 and corresponding ones are designated by like reference characters. Thus, curve A shows two line-synchronizing pulses L and L'. The response of the system to the first of these is precisely as described above, but the second image pulse $L_3$ to appear at input terminals 38, 38 of the delay network occurs in time coincidence with the second line pulse L'. Consequently, it is merged with the pulse variation established in the output circuit of tube 30 due to the line-synchronizing pulse L', giving rise to the pulse variation $L_3'$ which is of greater amplitude than the applied synchronizing pulses L, L'. Another cycle of conductance variations is started at this time in the cross coupled tubes which regenerates the image pulse $L_3$ and the concurrently applied line-synchronizing pulse L'. This effect is shown by the pulse component $P_1$ of curve D, which has a somewhat greater amplitude than the first component P thereof.

Thus, it is seen that the multiple-reflecting time-delay network produces a series of images in response to any applied pulse. One such image occurs in time phase with one of the applied recurring line pulses. Furthermore, this particular image is of such polarity as to aid the line pulse with which it coincides. Together, they initiate further cycles of conductance variations in the cross coupled tubes for regenerating image pulses obtained from the network with a delay equal to the line period and pulses of the line period concurrently applied to input terminal 40 with negative polarity. The specific adjustment of the system is such that in its continuous response to recurring line-synchronizing pulses, the regeneration causes tube 31 to be fully conductive during the translation of the line pulses. Since this result is attributed at least in part to the reflecting phenomenon of the time-delay network, it is achieved only for pulses that are harmonically related to the line pulses. Inasmuch as noise, static and other spurious signals usually have widely different periods, they do not experience the same amplitude gain in translation through the system. For this reason the output signal obtained from tube 31 includes line-synchronizing pulses with greatly increased amplitude. It also has components $p'$ of positive polarity but very small amplitude, occasioned by images of negative polarity that drive tube 31 to anode-current cutoff. Such undesired pulses may be deleted by applying the output signal to the line-scanning generator through a limiting amplifier which responds to signals having the polarity of the desired line pulses only. By using an amplitude-selective synchronizing control system in the line-scanning generator, the generator may be caused to respond substantially only to the desired line-frequency pulses.

Another important feature of separator 20 may be understood from a consideration of its response during the leading and trailing portions of the field-retrace interval in which the composite synchronizing signal supplied from unit 18 includes identical equalizing pulses, having half the duration of the line pulses but occurring at twice the line frequency. In curve A of Fig. 3, the components E, E' and E'' represent three such equalizing pulses of which pulses E and E'' are desired to maintain synchronization of the line-scanning generator. Pulse E' which is midway therebetween and all other equalizing components spaced from pulse E' by an integral multiple of the line period are undesired insofar as synchronization of the line-scanning generator is concerned. The translation of the desired pulses E and E'' to the output circuit, where they appear as components $P_2$ and $P_3$ of the output signal, is similar to that explained in the foregoing description in connection with line pulse L'. The unwanted equalizing pulses, such as that designated E', are not translated to the line-scanning generator for the following reason.

At the time $t_5$ when the pulse E' is applied, the first image $E_1$ of the regenerated equalizing pulse E is presented with negative polarity to the input end of time-delay network 36, 37. This image in the preferred operation of the system is greater in amplitude than equalizing pulse E' and biases tube 31 to cutoff. With tube 31 cut off, signal translation through the system is suppressed or interrupted and, therefore, separator 20 is effective to isolate the line-scanning generator from the undesired ones of the equalizing pulses.

The undesired equalizing pulse E' tends to weaken the reversed-polarity image $E_1$ which occurs simultaneously at the input end of the delay network. However, the effect is small because it is not reinforced by regeneration. Also, the number of line pulses is so large in comparison with the number of equalizing pulses that the amplitude gain, received by virtue of regeneration in the system of Fig. 1, may cause the step portions of components $P_2$ and $P_3$ of the output signal to be imperceptible. In any event, the wave form of the leading edge of each pulse included in the output signal is preserved so that line-synchronization may be maintained since the synchronizing control of the line-scanning generator usually responds to that portion of the synchronizing pulses.

By way of illustration, the following circuit constants and conditions are considered suitable for a practical application of the present invention.

| | |
|---|---|
| Tubes **30** and **31** | Commercial type 6J7 |
| Time-delay network **36, 37**: | |
| Characteristic impedance | 3400 ohms |
| One-way delay | 1/63,000 sec. |
| Resistor **32** (both parts) | 6000 ohms |
| Resistor **33** | 2000 ohms |

A further advantage of the illustrated arrangement lies in its ability to supply to a separate ACC detector a signal that is substantially free of all components other than the line-frequency pulses. The use of a separate ACC detector, as suggested, is fully disclosed in the above-identified copending application, Serial No. 692,533. The same type of arrangement may be used with intersynchronizing signal separator 20 of this invention.

The separator 20 has a small physical size because it employs a quarter-period time-delay network 36, 37. This enables a saving in space over other prior arrangements which utilize full-period or half-period delay networks while at the same time affording a favorable discrimination for pulses having a duration short with reference to the one-way delay of the network and recurring at a fixed period related to the delay.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for translating desired recurring signal pulses having a given period and for distinguishing such pulses from undesired periodic signals having the same frequency as said desired pulses but occurring approximately halfway between said desired pulses comprising: a signal-translating stage including a pair of vacuum tubes cross coupled so that a pulse of a given polarity applied thereto effects a complete cycle of conductance variations in opposite senses in said tubes to translate the applied pulse therethrough; a multiple-reflecting time-delay means included in said stage and so proportioned as to have a round-trip time-delay period corresponding substantially to one-half of said given period so that an applied pulse translated along said time-delay means produces a delayed image thereof, said delay means being coupled to said tubes to apply said image thereto to initiate other cycles of conductance variations in said tubes for regenerating image pulses obtained from said delay means and pulses of said given period applied to said system with said given polarity; an input circuit for said system; means for applying said recurring pulses to said input circuit with said given polarity; and an output circuit for supplying pulses translated through said system to a utilizing device.

2. A system for translating desired recurring signal pulses having a given period and for distinguishing such pulses from undesired periodic signals having the same frequency as said desired pulses but occurring approximately halfway between said desired pulses comprising: a signal-translating stage including a pair of vacuum tubes cross coupled so that a pulse of a given polarity applied thereto effects a complete cycle of conductance variations in opposite senses in said tubes to translate the applied pulse therethrough; a multiple-reflecting time-delay means so proportioned as to have a round-trip time-delay period corresponding substantially to one-half of said given period so that an applied pulse translated along said time-delay means produces a delayed image thereof delayed by an amount equal to said given period, said delay means being coupled to said tubes to apply said image thereto to initiate other cycles of conductance variations in said tubes for regenerating image pulses obtained from said delay means and pulses of said given period applied to said system with said given polarity; an input circuit for said system; means for applying said recurring pulses to said input circuit with said given polarity; and an output circuit for supplying pulses translated through said system to a utilizing device.

3. A system for translating desired recurring signal pulses having a given period and for distinguishing such pulses from undesired periodic signals having the same frequency as said desired pulses but occurring approximately halfway between said desired pulses comprising: a signal-translating stage including a pair of vacuum tubes cross coupled so that a pulse of a given polarity applied thereto effects a complete cycle of conductance variations in opposite senses in said tubes to translate the applied pulse therethrough; a multiple-reflecting time-delay means so proportioned as to have a round-trip time-delay period corresponding substantially to one-half of said given period so that an applied pulse translated along said time-delay means alternately produces after one round trip a delayed image of said applied pulse reversed in polarity and delayed by one-half of said given period and after a second round-trip a delayed image having the same polarity as said applied pulse but delayed by said given period, said delay means being coupled between said tubes to apply said images thereto to assist in the translation of said desired recurring signal pulses while rejecting said undesired signals; an input circuit for said system; means for applying said recurring pulses to said input circuit with said given polarity; and an output circuit for supplying pulses translated through said system to a utilizing device.

4. A system for translating desired recurring signal pulses having a given period and for distinguishing such pulses from undesired periodic signals having the same frequency as said desired pulses but occurring approximately halfway between said desired pulses comprising: a regenerative signal-translating stage including a pair of vacuum tubes cross coupled so that a pulse of a given polarity applied thereto effects a complete cycle of conductance variations in opposite senses in said tubes to translate the applied pulse therethrough with an amplitude gain; a multiple-reflecting time-delay means so proportioned as to have a round-trip time-delay period corresponding substantially to one-half of said given period so that an applied pulse translated along said time-delay means alternately produces after one round trip a delayed image of said applied pulse reversed in polarity and delayed by one-half of said given period and after a second round trip a delayed image having the same polarity as said applied pulse but delayed by said given period, said delay means being coupled between said tubes to apply said images thereto to assist in the translation of said desired recurring signal pulses while rejecting said undesired signals; an input circuit for said system; means for applying said recurring pulses to said input circuit with said given polarity; and an output circuit for supplying pulses translated through said system to a utilizing device.

5. A system for translating desired recurring signal pulses having a given period and for distinguishing such pulses from undesired periodic signals having the same frequency as said desired pulses but occurring approximately halfway between said desired pulses comprising: a signal-translating stage including a pair of vacuum tubes having input and output electrodes and cross coupled so that a pulse of a given polarity applied thereto effects a complete cycle of conductance variations in opposite senses in said tubes to translate the applied pulse therethrough; a multiple-reflecting time-delay network included in said stage, connected at one end to said output electrodes of one of said tubes and to said input electrodes of the other of said tubes, said network being so proportioned as to have a round-trip time-delay period corresponding substantially to one-half of said given period so that an applied pulse translated along said time-delay network alternately produces after one round trip a delayed image of said applied pulse reversed in polarity and delayed by one-half of said given period and after a second round trip a delayed image having the same polarity as said applied pulse but delayed by said given period, said network thereby assisting said tubes in the translation of said desired recurring signal pulses and in rejecting said undesired signals; an input circuit for said system; means for applying said recurring pulses to said input circuit with said given polarity; and an output circuit for supplying pulses translated through said system to a utilizing device.

6. A system for translating desired recurring signal pulses having a given period and for distinguishing such pulses from undesired periodic signals having the same frequency as said desired pulses but occurring approximately halfway between said desired pulses comprising: a signal-translating stage including a pair of vacuum tubes having input and output electrodes; means for normally maintaining one of said tubes in a highly conductive condition, for normally maintaining the other close to anode-current cutoff, and for cross coupling said tubes so that a pulse of a given polarity applied thereto effects a complete cycle of conductance variations in opposite senses in said tubes to translate the applied pulse therethrough; a multiple-reflecting time-delay network so proportioned as to have a round-trip time-delay period corresponding substantially to one-half of said given period so that an applied pulse translated along said time-delay network alternately produces after one round trip a delayed image of said applied pulse reversed in polarity and delayed by one-half of said given period and after a second round trip a delayed image having the same polarity as said applied pulse but delayed by said given period, said delay network being coupled between said tubes to apply said images thereto to assist in the translation of said desired recurring signal pulses while rejecting said undesired signals; an input circuit for said system; means for applying said recurring pulses to said input circuit with said given polarity; and an output circuit for supplying pulses translated through said system to a utilizing device.

7. A system for translating desired recurring signal pulses having a given period and for distinguishing such pulses from undesired periodic signals having the same frequency as said desired pulses but occurring approximately halfway between said desired pulses comprising: a signal-translating stage including a pair of vacuum tubes having input and output electrodes; means for normally maintaining one of said tubes in a highly conductive condition, for normally maintaining the other close to anode-current cutoff, and for cross coupling said tubes so that a pulse of negative polarity applied to said one tube effects a complete cycle of conductance variations in opposite senses in said tubes to translate the applied pulse therethrough; a multiple-reflecting time-delay network so proportioned as to have a round-trip time-delay period corresponding substantially to one-half of said given period so that an applied pulse translated along said time-delay network alternately produces after one round trip a delayed image of said applied pulse reversed in polarity and delayed by one-half of said given period and after a esecond round trip a delayed image having the same polarity as said applied pulse but delayed by said given period, said network being coupled between said tubes to apply said images thereto to assist in the translation of said desired recurring signal pulses while rejecting said undesired signals; an input circuit for said system connected with said input electrodes of said one tube; means for applying said recurring pulses to said input circuit with said negative polarity; and an output circuit connected with said output electrodes of said other tube for supplying pulses translated through said system to a utilizing device.

8. A system for translating desired recurring signal pulses having a given period and for distinguishing such pulses from undesired periodic signals having the same frequency as said desired pulses but occurring approximately halfway between said desired pulses comprising: a stabilized regenerative signal-translating stage including a pair of vacuum tubes cross coupled so that a pulse of a given polarity applied thereto effects a complete cycle of conductance variations in opposite senses in said tubes to translate the applied pulse therethrough; a multiple-reflecting time-delay network so proportioned as to have a round-trip time-delay period corresponding substantially to one-half of said given period so that an applied pulse translated along said time-delay network alternately produces after one round trip a delay image of said applied pulse reversed in polarity and delayed by one-half of said given period and after a second round trip a delayed image having the same polarity as said applied pulse but delayed by said given period, said network being coupled between said tubes to apply said images thereto to assist in the translation of said desired recurring signal pulses while rejecting said undesired signals; an input circuit for said system; means for applying said recurring pulses to said input circuit with said given polarity; and an output circuit for supplying pulses translated through said system to a utilizing device.

9. A system for translating desired recurring signal pulses having a given period and for distinguishing such pulses from undesired periodic signals having the same frequency as said desired pulses but occurring approximately halfway between said desired pulses comprising: a regenerative signal-translating stage including a pair of vacuum tubes cross coupled so that a pulse of a given polarity applied thereto effects a complete cycle of conductance variations in opposite senses in said tubes to translate the applied pulse therethrough; a cathode impedance connected with one of said tubes to stabilize the operation of said stage; a multiple-reflecting time-delay network so proportioned as to have a round-trip time-delay period corresponding substantially to one-half of said given period so that an applied pulse translated along said time-delay network alternately produces after one round trip a delayed image of said applied pulse reversed in polarity and delayed by one-half of said given period and after a second round trip a delayed image having the same polarity as said applied pulse but delayed by said given period, said network being coupled between said tubes to apply said images thereto to assist in the translation of said desired recurring signal pulses while rejecting said undesired signals; an input circuit for said system; means for applying said recurring pulses to said input circuit with said given polarity; and an output circuit for supplying pulses translated through said system to a utilizing device.

10. A system for translating desired recurring signal pulses having a given period and for distinguishing such pulses from undesired periodic signals having the same frequency as said desired pulses but occurring approximately halfway between said desired pulses comprising: a regenerative signal-translating stage including a pair of vacuum tubes cross coupled so that a pulse of a given polarity applied thereto effects a complete cycle of conductance variations in opposite senses in said tubes to translate the applied pulse therethrough; a multiple-reflecting time-delay network so proportioned as to have a round-trip time-delay period corresponding substantially to one-half of said given period so that an applied pulse translated along said time-delay network alternately produces after one round trip a delayed image of said applied pulse reversed in polarity and delayed by one-half of said given period and after a second round trip a delayed image having the same polarity as said applied pulse but delayed by said given period, said network being coupled between said tubes to apply said images thereto so that said image having the same polarity assists in the translation of said desired recurring signal pulses while said image having said reversed polarity assists in rejecting said undesired signals; an input circuit for said system; means for applying said recurring pulses to said input circuit with said given polarity; and an output circuit for supplying pulses translated through said system to a utilizing device.

11. A system for translating desired recurring signal pulses having a given period and for distinguishing such pulses from undesired periodic signals having the same frequency as said desired pulses but occurring approximately halfway between said desired pulses comprising: a signal-translating stage including a pair of vacuum tubes cross coupled so that a pulse of a given polarity applied thereto effects a complete cycle of conductance variations in opposite senses in said tubes to translate the applied pulse therethrough; a multiple-reflecting short-circuited time-delay network so proportioned as to have a round-trip time-delay period corresponding substantially to one-half of said given period so that an applied pulse translated therealong alternately produces after one round trip a delayed image of said applied pulse reversed in polarity and delayed by one-half of said given period and after a second round trip a delayed image having the same polarity as said applied pulse but delayed by said given period, said network being coupled between said tubes to apply said images thereto to assist in the translation of said desired recurring signal pulses while rejecting said undesired signals; an input circuit for said system; means for applying said recurring pulses to said input circuit with said given polarity; and an output circuit for supplying pulses translated through said system to a utilizing device.

12. A system for translating desired recurring signal pulses having a given period and for distinguishing such pulses from undesired periodic signals having the same frequency as said desired pulses but occuring approximately halfway between said desired pulses comprising: a signal-translating stage including a pair of vacuum tubes having input and output electrodes; means for normally maintaining one of said tubes in a highly conductive condition, for normally maintaining the other of said tubes close to anode-current cutoff, and for cross coupling said tubes so that a pulse of a given polarity applied thereto to effects a complete cycle of conductance variations in opposite senses in said tubes to translate the applied pulse therethrough; a multiple-reflecting time-delay network so proportioned as to have a round-trip time-delay period corresponding substantially to one-half of said given period so that an applied pulse translated along said network alternately produces after one round trip a delayed, reversed polarity image of said applied pulse and delayed by one-half of said given period and after a second round trip a delayed image having the same polarity as said applied pulse but delayed by said given period, said network being coupled between said tubes to apply said images thereto so that said images having the same polarity assists in the translation of said desired recurring signal pulses while said image having said reversed polarity is effective to bias said other tube to anode-current cutoff to suppress the translation of said undesired signals through said stage; an input circuit for said system; means for applying said recurring pulses to said input circuit with said given polarity; and an output circuit for supplying pulses translated through said system to a utilizing device.

ALAN HAZELTINE.

REFERENCES CITED

The following references are of record in the file of this patent:

UNITED STATES PATENTS

| Number | Name | Date |
|---|---|---|
| 2,188,970 | Wilson | Feb. 6, 1940 |
| 2,221,666 | Wilson | Nov. 12, 1940 |
| 2,255,839 | Wilson | Sept. 16, 1941 |
| 2,266,154 | Blumlien | Dec. 16, 1941 |
| 2,413,956 | Coykendall | Jan. 7, 1947 |
| 2,416,424 | Wilson | Feb. 25, 1947 |
| 2,436,808 | Jacobsen | Mar. 2, 1948 |
| 2,445,448 | Miller | June 20, 1948 |

FOREIGN PATENTS

| Number | Country | Date |
|---|---|---|
| 530,956 | Great Britain | Dec. 24, 1940 |
| 578,690 | Great Britain | July 9, 1946 |